No. 772,999. PATENTED OCT. 25, 1904.
C. H. BOECK.
PORTABLE OVEN.
APPLICATION FILED NOV. 1, 1902.
NO MODEL. 2 SHEETS—SHEET 1.
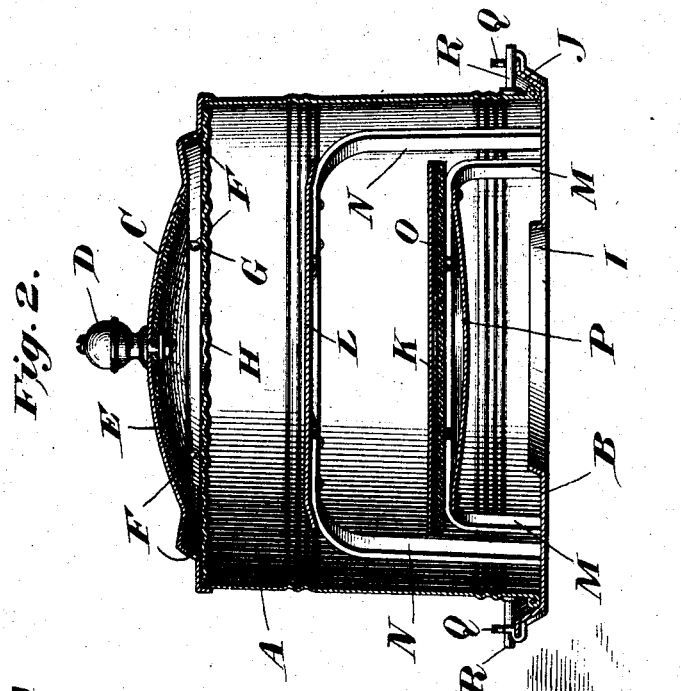
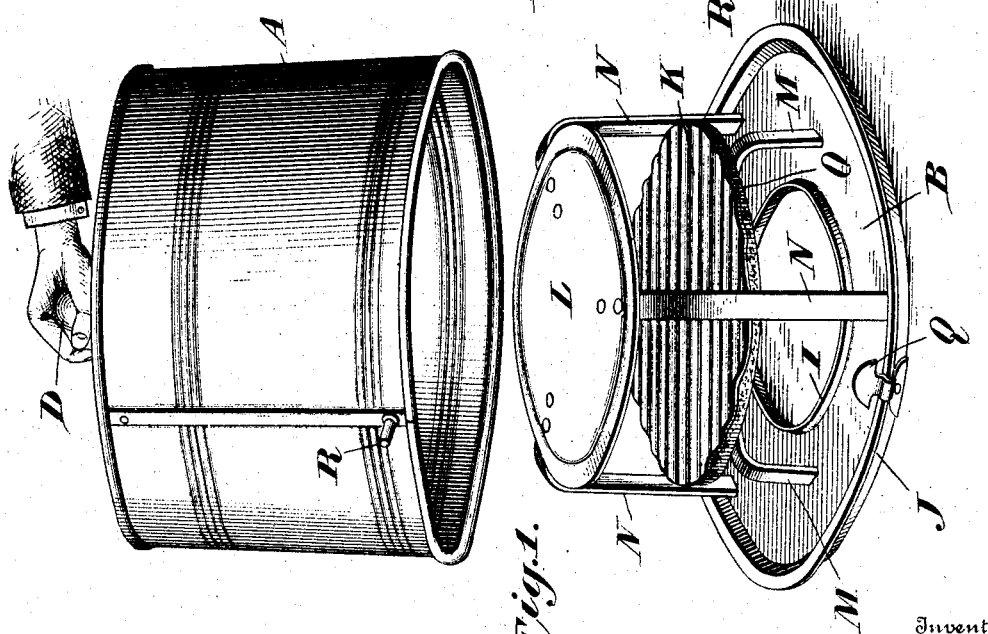
Witnesses
Elmer Seavey
Osgood H. Dowell
Inventor
Charles H. Boeck
By Julian A. Dowell
his Attorney.

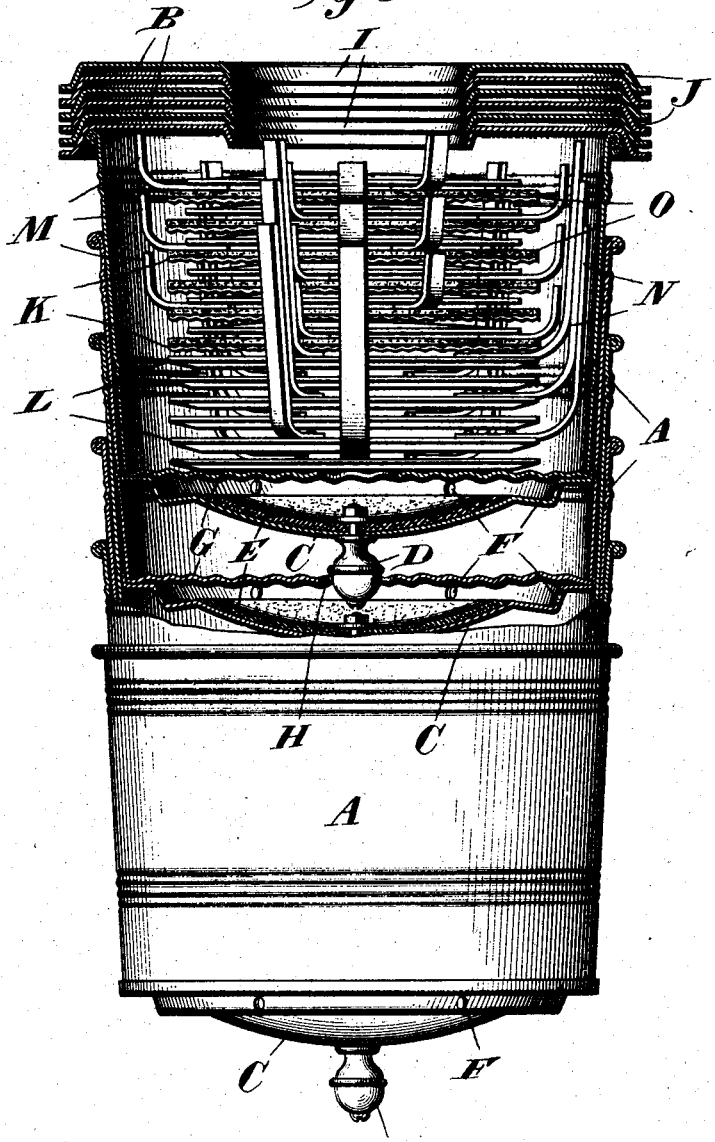

No. 772,999.

Patented October 25, 1904.

UNITED STATES PATENT OFFICE.

CHARLES H. BOECK, OF JACKSON, MICHIGAN, ASSIGNOR TO NOVELTY MANUFACTURING COMPANY, OF JACKSON, MICHIGAN, A CORPORATION OF MICHIGAN.

PORTABLE OVEN.

SPECIFICATION forming part of Letters Patent No. 772,999, dated October 25, 1904.

Application filed November 1, 1902. Serial No. 129,765. (No model.)

*To all whom it may concern:*

Be it known that I, CHARLES H. BOECK, a citizen of the United States, residing at Jackson, in the county of Jackson and State of Michigan, have invented certain new and useful Improvements in Portable Ovens; and I do hereby declare the following to be a full, clear, and exact description of the invention, such as will enable others skilled in the art to which it appertains to make and use the same.

This invention relates to portable ovens or bakers, particularly for gas, gasolene, and other light cooking stoves; and the principal objects thereof are, first, to provide a simple and convenient oven having a detachable base, which, together with the shelves and food resting thereon, may be lifted by and with the cover or body of the oven, so that the oven may be placed on or taken off the stove or other support, while the body of the oven may be raised from its base when desired, as for the purposes of inspecting food during the process of baking or for removing cooked food, whereby the heat naturally arising will be retained in the body of the oven and be prevented from escaping, as in ovens with side doors; second, to provide a construction of this character which will permit nesting a number of ovens with all their parts together or arranging them one within another, so as to occupy the smallest possible space, which is a specially advantageous feature in shipping or storage, where cubic capacity rather than weight is considered.

The invention will first be described with reference to the accompanying drawings, which form a part of this specification, and will be then pointed out in the annexed claims.

In said drawings, Figure 1 is a perspective view of my improved oven, showing the body thereof raised from the base. Fig. 2 is a central vertical section of the oven with all its parts in regular position; and Fig. 3 is a view, part in side elevation and part in central vertical section, of a number of ovens nested together.

The letter A designates the body of the oven, and B denotes its detachable base. Both of these are shown round in shape, though they may be elliptical, square, or polygonal.

The body of the oven consists of a cylindrical or other suitably-shaped casing open at its bottom and closed at its upper end by a rigidly-attached or integral top plate C, which is preferably provided with a central knob or handle D, of wood or other material non-conductive of heat. The top plate, as shown, has a central convex part, on the under concave side of which an asbestos sheet E is secured by the same screw and nut which holds the knob or handle D, and has also near its circumference an annular strengthening rib or corrugation which is provided with a number of air vents or openings F. A corrugated metallic plate or deflector G extends across the top of the casing beneath the top plate C, said deflector having a central opening H, through which the hot air arises into the space between said deflector and said top plate, whence it passes out through the vents F. These details of construction may be changed, however, and parts may be omitted in some cases.

The base B, as shown, consists of a wide flat annulus adapted to be placed on the stove with its central openings over the flame or fire. This base is preferably formed at both its inner and outer peripheries with upturned edges or flanges I and J, respectively, so that the base constitutes an annular pan which confines all grease and fluids therein and prevents them from flowing into the fire or onto the stove, while the outer flange also keeps the cover or body of the oven in place.

The letters K and L denote oven-shelves, which are supported by legs M and N, respectively, resting on the base B, the shelf L being higher and its legs longer than those of the lower shelf and inclosing the latter. The oven can be used with one or both shelves, or any suitable number may be employed, according to the character of the cooking and the height of the oven. The lower shelf K is shown corrugated to allow for expansion and contraction on account of its proximity to the fire, and to its lower side is attached an asbestos sheet O to keep off the heat and prevent burning of food on this shelf, while beneath said asbestos sheet a convex deflector P is attached. The upper shelf is shown as a simple flat metal plate; but both shelves may be of any suitable construction. The legs of the shelves extend laterally from the edges thereof, and their lower ends are sufficiently close to the interior walls of the oven-body to prevent displacement.

The oven may of course be used without shelves, as by placing the food to be baked in a suitable pan or receptacle over the central opening in the base or by employing a flat closed or solid base, instead of an annular or centrally-open one, upon which the articles to be cooked may be directly supported.

The body of the oven may be raised from its base when desired, as for the purposes of inspecting or treating food during the process of baking or inserting or removing food, and the heat in the oven, which naturally arises, is retained in the raised body thereof, and is thus prevented from escaping, with consequent retardation of the baking process or injury to the food, as is the case with ovens having side doors. Suitable devices are provided, however, whereby the body of the oven may be fastened or engaged to its base when desired, so that the whole oven may be lifted by the knob or handle D. This dispenses with the necessity of handles at opposite sides of the base, which not only require the use of both hands of the person baking, but also become very hot, owing to their proximity to the stove, whereas the knob D requires but one hand and is protected from the heat by its distance from the fire and also by the asbestos sheet E. The devices shown for such purpose consist of upstanding T-shaped lugs or attachments Q, disposed, preferably, at opposite sides of the base, and similarly-disposed pins or studs R, projecting out from the casing A near its bottom and adapted to engage under said lugs, so that the base, with the shelves resting thereon, may be lifted by and with the body of the oven. The construction is such that when the body of the oven is set on its base, in which it is held in place by the outer upturned rim or flange thereof, it may be turned and the pins R will ride under opposite projections of the respective lugs or attachments. It makes no difference in which direction the body of the oven is turned, for the pins will engage under the lugs at both ends of the latter. In some constructions the pins may be secured to the base and the lugs attached in inverted position to the casing or body of the oven, and other suitable devices may be employed in lieu of said pins and lugs for effecting proper engagement between the casing and the base.

It will be observed that the body of the oven is slightly flaring toward its bottom and the legs of the shelves K and L are outwardly inclined, the legs of the upper shelf being also farther from the center than the legs of the lower shelf, while the inner and outer rims or flanges of the base or annular bottom pan are flaring upwardly. This permits a number of ovens to be nested together or placed one within another in an exceedingly compact manner, as illustrated in Fig. 3, where six ovens are shown so assembled. First, the main casings or oven-bodies, which of course are set sidewise or inverted, as shown, are fitted one within another, the knobs or handles D of each inclosed oven-body fitting within the central opening in the deflector G of the inclosing oven-body, or said knobs may be removed and packed inside. Then the upper shelves L are arranged one within another within the last or upper oven-body. Then the lower shelves K are similarly arranged within the legs of the last or upper shelf L, which approximately fills up the inner space of the last oven-body, and finally the bases B may be fitted one over another on the end of the last oven-body.

Having thus fully described my invention, what I claim as new, and desire to secure by Letters Patent of the United States, is—

1. A portable oven comprising an annular base having a central opening and a peripheral upturned rim or flange, a removable casing or oven-body having a closed top and an open bottom adapted to rest on said base and fit closely within said rim, a circular food-supporting shelf over said opening having a bottom heat-deflector and an interposed asbestos sheet and depending legs resting on said base around said opening, a superposed shelf having legs surrounding the lower shelf and resting on said base, and coöperating devices on said rim and lower end of the casing adapted when the latter rests on said base to connect or disconnect the two members on turning the casing one way or the other.

2. In a portable oven, a flaring or gradually-widening open-bottomed casing or oven-body, said casing having a top plate provided with a central knob or handle, and an interior transverse plate or deflector beneath said top plate having a central opening adapted to receive the knob or handle of another oven-body placed therein, whereby a number of said ovens may be nested together, substantially as described.

3. In a portable oven, an open-bottomed downwardly-flaring or gradually-widening casing or oven-body, a separate base or bottom having an upwardly-flaring rim or flange, and a shelf or shelves having supporting-legs resting on said base and downwardly and outwardly inclined, substantially as described.

4. In a portable oven, an open-bottomed downwardly-flaring casing or oven-body, and a separate base therefor having an upwardly-flaring rim or flange, said casing being adapted to rest on said base and fit within said rim, whereby a number of such parts may be nested.

In testimony whereof I affix my signature in presence of two witnesses.

CHARLES H. BOECK.

Witnesses:
D. R. TARBELL,
H. M. RUSSELL.